(12) United States Patent
Nagatsuka

(10) Patent No.: US 7,455,216 B2
(45) Date of Patent: Nov. 25, 2008

(54) PRINTED-MATTER ISSUING MANAGING SYSTEM, PRINTED-MATTER VERIFYING DEVICE AND CONTENTS MANAGING DEVICE

(75) Inventor: Ikutaroh Nagatsuka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1048 days.

(21) Appl. No.: 10/319,569

(22) Filed: Dec. 16, 2002

(65) Prior Publication Data
US 2003/0217274 A1 Nov. 20, 2003

(30) Foreign Application Priority Data
May 17, 2002 (JP) .............................. 2002-143788

(51) Int. Cl.
G06F 17/00 (2006.01)
G06F 15/00 (2006.01)
G06F 7/00 (2006.01)
G06F 7/04 (2006.01)
G06K 7/08 (2006.01)
G06K 7/00 (2006.01)
G06K 1/00 (2006.01)
G06K 15/00 (2006.01)
G06K 19/00 (2006.01)
G05B 19/00 (2006.01)
G05B 23/00 (2006.01)
H04B 1/00 (2006.01)

(52) U.S. Cl. ........................ 235/375; 235/435; 235/451; 358/1.14; 340/5.61

(58) Field of Classification Search .................. 235/375, 235/435, 451; 340/572.1, 572.8, 5.61, 5.86; 358/1.14, 14.15, 1.16
See application file for complete search history.

(56) References Cited

U.S. PATENT DOCUMENTS

| | | | |
|---|---|---|---|
| 5,245,329 A * | 9/1993 | Gokcebay | .................. 340/5.33 |
| 6,529,288 B1 | 3/2003 | Miyazaki | |
| 7,028,884 B2 * | 4/2006 | Nyfelt | ........................ 235/375 |
| 7,066,388 B2 * | 6/2006 | He | .............................. 235/383 |
| 7,108,186 B2 * | 9/2006 | Lubow | .................. 235/462.01 |
| 7,140,534 B2 * | 11/2006 | Miyazawa et al. | .......... 235/375 |
| 7,231,067 B2 * | 6/2007 | Patton et al. | ................. 382/115 |
| 7,347,378 B2 * | 3/2008 | Frohlich et al. | ............. 235/487 |
| 2002/0077841 A1 * | 6/2002 | Thompson | ..................... 705/1 |

(Continued)

FOREIGN PATENT DOCUMENTS

EP 1755065 A2 * 2/2007

(Continued)

*Primary Examiner*—Daniel Walsh
(74) *Attorney, Agent, or Firm*—Oliff & Berridge, PLC

(57) ABSTRACT

A printed-matter issuing client takes out contents from a contents management server, and prints the contents on a printing recording part, while at the same time records ID information indicative of a storage location of the contents into an IC chip integrated into the printing recording part. A printed-matter verifying client reads out an image to be verified on a printing surface of a printing recording part, by an information acquiring part, and acquires ID information from the IC chip. The printed-matter verifying client takes out contents from the contents management server according to the ID information, and verifies it with the image on the print surface, and it judges whether the printing recording part is true or false on the basis of the verifying result.

7 Claims, 5 Drawing Sheets

U.S. PATENT DOCUMENTS

| | | | |
|---|---|---|---|
| 2002/0100802 A1* | 8/2002 | Sehr | 235/384 |
| 2002/0198731 A1* | 12/2002 | Barnes et al. | 705/1 |
| 2003/0023557 A1* | 1/2003 | Moore | 705/50 |
| 2003/0068066 A1* | 4/2003 | Goldberg et al. | 382/100 |
| 2003/0102365 A1* | 6/2003 | Elderfield | 235/375 |
| 2003/0128099 A1* | 7/2003 | Cockerham | 340/5.7 |
| 2003/0154405 A1* | 8/2003 | Harrison | 713/201 |
| 2003/0217274 A1* | 11/2003 | Nagatsuka | 713/179 |
| 2004/0035934 A1* | 2/2004 | Miyazawa et al. | 235/454 |
| 2004/0081332 A1* | 4/2004 | Tuttle et al. | 382/100 |
| 2004/0118916 A1* | 6/2004 | He | 235/383 |
| 2004/0179713 A1* | 9/2004 | Tani et al. | 382/100 |
| 2005/0007631 A1* | 1/2005 | Fujinuma | 358/1.16 |
| 2005/0010776 A1* | 1/2005 | Kenen et al. | 713/176 |
| 2005/0072846 A1* | 4/2005 | Lubow | 235/462.01 |
| 2005/0116052 A1* | 6/2005 | Patton et al. | 235/494 |
| 2005/0178843 A1* | 8/2005 | Frohlich et al. | 235/487 |
| 2005/0200910 A1* | 9/2005 | Kanoshima et al. | 358/448 |
| 2005/0207677 A1* | 9/2005 | Hotta et al. | 382/305 |
| 2005/0219603 A1* | 10/2005 | Patton et al. | 358/1.14 |
| 2006/0017959 A1* | 1/2006 | Downer et al. | 358/1.14 |
| 2006/0132820 A1* | 6/2006 | Isshiki | 358/1.13 |
| 2006/0274945 A1* | 12/2006 | Chu et al. | 382/190 |
| 2007/0058178 A1* | 3/2007 | Kurihara et al. | 358/1.2 |
| 2007/0058994 A1* | 3/2007 | Yaguchi | 399/17 |
| 2007/0204164 A1* | 8/2007 | Cattrone et al. | 713/176 |
| 2007/0211314 A1* | 9/2007 | Saito et al. | 358/504 |

FOREIGN PATENT DOCUMENTS

| | | |
|---|---|---|
| JP | A 11-78176 | 3/1999 |
| JP | A 2000-211197 | 8/2000 |
| JP | A 2001-030587 | 2/2001 |
| JP | A 2001-134672 | 5/2001 |
| JP | A 2002-041695 | 2/2002 |
| JP | 2003305927 A * | 10/2003 |
| WO | WO 01/73539 | 10/2001 |
| WO | WO 01/91007 | 11/2001 |

* cited by examiner

PRINTED-MATTER ISSUING MANAGING SYSTEM, PRINTED-MATTER VERIFYING DEVICE AND CONTENTS MANAGING DEVICE

BACKGROUND OF THE INVENTION

1. Field of the Invention

The present invention relates to a printed-matter issuing managing system which issues printed matters that should be protected against their forgery, falsification, reproduction and the like, such as cash vouchers having cash values, securities and official and private documents having descriptions on rights and duties in the law of property, and which judges the authenticity of printed matters.

2. Description of the Related Art

With progress of the internet technology, a conventional system which is constructed with a private line, terminal equipment, and dedicated printers, including a system for issuing cash vouchers such as concert tickets, railway tickets and airplane tickets, will be superseded by a system constructed with the internet opened to everyone, commercially available computers and printers. Further, a conventional system not utilizing the network will also be superseded by a system utilizing the internet. For example, in the United States of America, electronic stamps are under test operation by Neopost corporation, E-Stamp corporation, StampMater corporation, etc., and will be in practical use. The electronic stamp is a system in which a user acquires cash value information indicating a stamp charge and prints a stamp mark as a postage stamp on an envelop, a postal card or a postcard, using a personal computer and a printer that are commercially available. The electronic stamp may be used as a postal stamp like the currently and generally used stamps.

In using a network that anyone can access, like the internet, the illegal actions are likely to occur. For example, a malicious third party wiretaps or alters the data, and further poses as the other party of communication to transmit and receive the data. In case where a monetary value information is handled on such a communication system, there is the necessity of preventing the data wiretapping and alteration, and preventing the malicious third party from posing as the other party. Various techniques for preventing the data wiretapping and alteration, and the pretense have been developed. Specific examples of such techniques are the digital signature or the electronic authentication by use of the public-key and common-key encryption techniques. For the digital signature or the electronic authentication by use of the public-key and common-key encryption techniques on the internet, reference is made to, for example, "Digital Signatures and Encryption" (published by Prentice Hall corporation).

In the case of an image data, an electronic watermark technique is known for preventing the illegal reproduction or alteration of the image data. In the technique, "watermark" is electronically embedded into the image data. The watermark technique is described in "Encryption System in Multimedia Era" (Maruyama Gakugei Tosho, in Japan), for example.

Further, there has been developed a mark into which a verification information is embedded by the electronic watermark technique, as a tool for verifying the authenticity of a home page on the internet. This mark prevents the illegal action, alteration and reproduction by use of the electronic watermark technique. If the printed matter is illegally altered or reproduced, a verification software, which is developed as means for checking the illegal actions of alteration, reproduction or the like, operates, and drives warning means to prohibit the mark from being displayed or overlays a mark "X" on the mark. The user sees it on the display screen, and can easily find out the illegal alteration. This technique is described in "Study and Development on the Techniques on Bona Fide of Internet Home Pages" (Communication/Broadcasting Organization).

The above-mentioned system constructed with the internet and terminal devices available in the market is designed to be used in a situation beyond the control by the issuers, such as homes, offices and public area. Accordingly, there is a chance that the user illegally issues printed matters, and uses the illegally issued printed matters.

To cope with this, Japanese Patent Laid-Open No. 11-78176, entitled "PRINTED MATTER PUBLICATION CONTROL SYSTEM, PRINTED MATTER PUBLICATION CONTROL METHOD AND PRINTER", proposes the printed matter issue control system and method for preventing illegal printed matters from being issued. In this technique, ID information is assigned to the printing recording medium in advance. The ID information assigned to the printing recording medium is related in advance to the information (referred to as "contents") to be printed on the printing recording medium. At the time of printing, the system reads the ID information of the printing recording medium by using a printer capable of reading the ID information from the medium, and judges if the medium is true, and if it is true, the printer prints the contents thereof. If no ID information is present or the printing recording medium or the printing recording medium corresponding to the ID information is already printed, it is judged that the medium is false, and the medium is not printed. In this way, the technique prevents the illegal printed matter from being issued.

The technique disclosed in Japanese Patent Laid-Open No. 11-78176 allows the contents to be printed on the true printing recording medium, and capable of preventing formation of printed matters having the same contents by the utilization of the ID information recorded on the printing recording medium as is printed. After the printing ends, the technique merely makes invalid the printing based on the same ID information as that recorded on the printing recording medium. When the contents printed on the printing recording medium is altered, the technique is incapable of judging whether the printed contents are true or false.

Japanese Patent Laid-Open No. 2001-134672 discloses a technique of judging an authenticity of an electronic sheet. The technique utilizes an electronic sheet as a printing recording medium having an IC chip integrated thereinto. The electronic sheet allows information to be printed on the surface of the sheet per se. The IC chip allows information to electronically be written into and read out of the chip per se in non-contact manner. A certify key is written into the IC chip. The technique judges if the electronic sheet is true or false by use of the certify key. Since the technique of Japanese Patent Laid-Open No. 2001-134672 judges if the electronic sheet is true or false by using only the certify key at the time of verification, a verifying device cannot judge if the prints are falsified in case where information as properly printed on the electronic sheet is altered in some manner.

SUMMARY OF THE INVENTION

An object of the present invention is to provide a printed-matter issuing managing system which is capable of judging the authenticity of a printed matter even in case where the contents of the printed matter printed on a printing recording medium are altered, and guarantees the safety of the printed contents on the printed matter, and a printed matter verifying device and a contents managing device which are for use with the printed-matter issuing managing system.

According to one aspect of the invention, there is provided a printed-matter issuing managing system comprising: a contents management section for managing contents; a printed-matter issuing section for printing the contents acquired from the contents management section on a printing recording medium; and a printed-matter verifying section for verifying the authenticity of a printing recording medium to be verified. The printing recording medium contains ID information for specifying the contents. In the printed-matter issuing managing system, the printed-matter verifying section reads out the ID information from the printing recording medium to be verified, and compares image information of the contents specified by the ID information with an image printed on the printing recording medium, thereby verifying the authenticity of the printing recording medium. The judgement of the authenticity of the printing recording medium through the verification may be made by the printed-matter verifying section or the contents management section.

According to another aspect of the invention, there is provided a printed-matter verifying device for use with a system in which a printing recording medium on which the details of contents are printed and which contains ID information for specifying the contents, is authenticated in a part of the system which reads an image of the printing recording medium. The printed-matter verifying device reads an image from the printing recording medium, together with the ID information; it inquires of an external device on the basis of the ID information and acquires an image of contents printed on the printing recording medium; and verifies the authenticity of the printing recording medium by comparing the acquired contents image with the image read from the printing recording medium.

According to yet another aspect, there is provided a contents management device for use with a system which manages contents and printing recording media with the contents printed thereon, and judges the authenticity of a printed matter in a part of the system which manages the contents. The contents management device receives from an external device ID information for specifying contents printed on a printing recording medium and an image readout together with the ID information, specifies the contents by the ID information, compares it with the image to thereby verify the authenticity of the printing recording medium, and sends the verification result to the external device.

In the invention, the details of the contents and ID information for specifying the contents are recorded in a printing recording medium. To verify a printing recording medium to be verified, an image is read from the printing recording medium, together with the ID information recorded in the medium. The contents specified by the ID information is compared with the image printed on the printing recording medium. If those are coincident with each other, the printing recording medium under verification is judged to be true.

Thus, in the invention, the contents printed on the printing recording medium is compared with the details of the contents as the original contents to thereby verify the authenticity of the printing recording medium. Even if contents are properly printed on a printing recording medium and later the print surface of the medium is altered, the invention judges that the printing recording medium having the altered print surface is false, by the verification based on the image thereof. Thus, the invention ensures the safety in a very high level against the falsification of the contents printed on the printing recording medium. Since the contents are specified by utilizing the ID information, the printed matter in which the image on the print surface thereof is merely altered in malice and illegally copied is easily found to be false.

A printing recording medium containing a IC chip, for example, may be used for the printing recording medium. ID information may be recorded in the IC chip. In this case, the invention, like the conventional technique, can secure a high level of safety against the forgery and illegal duplication, and further against the falsification of the medium by the image basis verification.

The ID information may be expressed in the form of any of an electronic watermark, latent image, invisible print by infrared or ultraviolet rays and others, and it is formed when the contents are printed. In the case, the printed-matter verifying section reads an image from the printing recording medium, and then separates the ID information from the read image, and then recognizes the ID information.

Information of the storage place of the contents, for example, may be contained in the ID information. If so done, the contents can be specified by using the storage place information. It may be used as an inquiry address when the printed-matter verifying section acquires image information of the contents. Further, it may be used as a transfer destination to which the image of the printing recording medium is to be transferred. The ID information contains a code ID for verifying the printing recording medium at the time of verification, and information on a storage place of reference information relating an identifier to the contents.

DETAILED DESCRIPTION OF THE PREFFERED EMBODIMENTS

Figure 1:
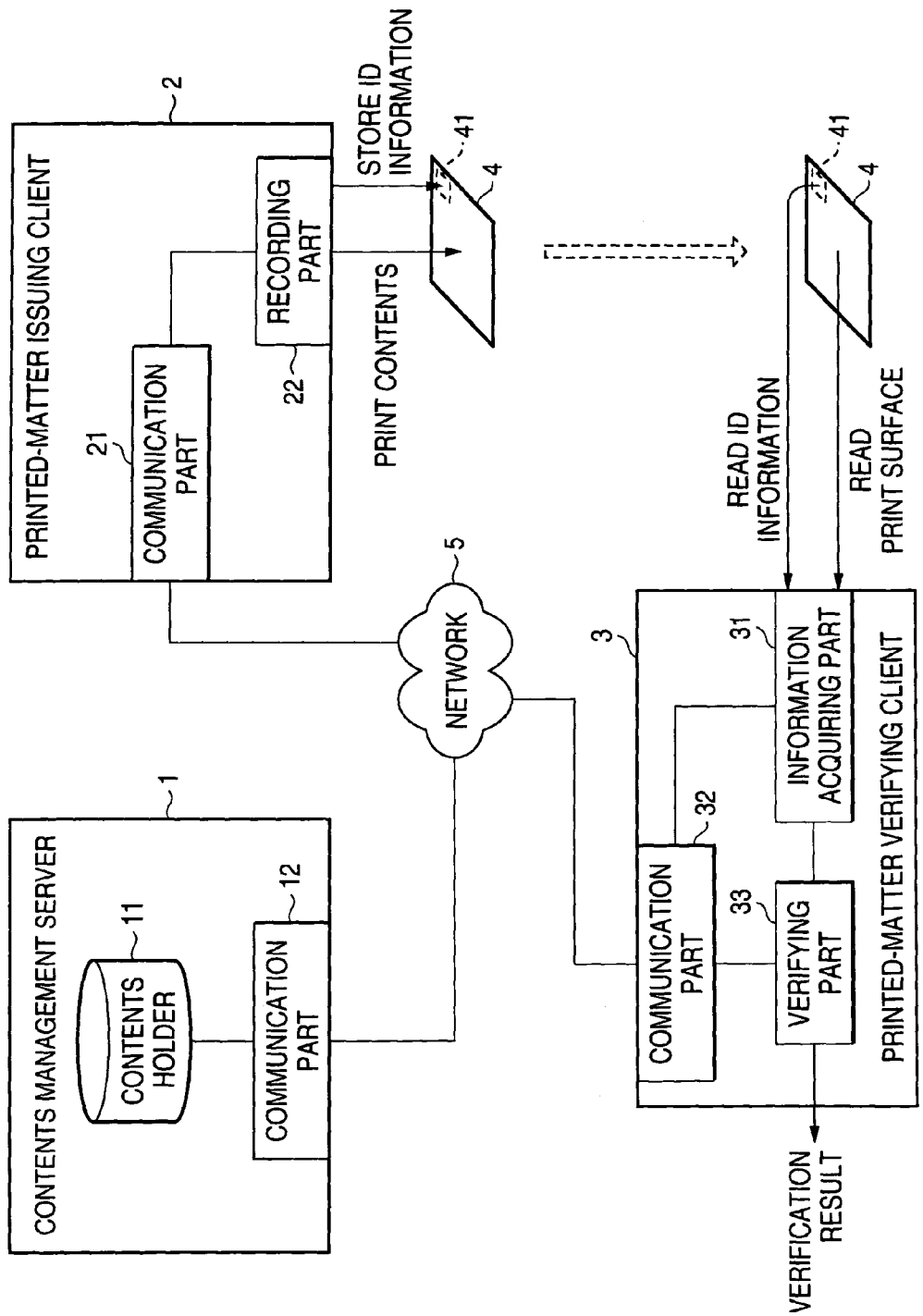
FIG. 1 is a block diagram showing a first embodiment of the present invention.

FIG. 1 is a block diagram showing a first embodiment of the present invention. In the figure, reference numeral 1 is a contents management server; 2 is a printed-matter issuing client; 3 is a printed-matter verifying client; 4 is a printing recording medium; 5 is a network; 11 is a contents holder; 12, 21, 32 are communication parts; 22 is a recording part; 31 is an information acquiring part; 33 is a verifying part; and 41 is an IC chip. In the embodiment of FIG. 1, the contents management server 1, printed-matter issuing client 2, and printed-matter verifying client 3 are interconnected by the network 5 and are mutually communicable with one another. The printing recording medium 4 used in the embodiment includes the IC chip 41 incorporated thereinto, and can retain data by the IC chip 41. The printing recording medium 4 may be a paper, a rewritable paper or a film-like electronic recording medium. The film-like electronic medium includes a medium allowing an image to be formed thereon electrically, optically or electromagnetically. In the description to follow, those image formation process will be involved in "printing process".

The contents management server 1 stores and manages various contents. The contents may take any form of information such as securities which requires the judgement of its authenticity when it is used. The data type for the contents is optional, and may be text data or image data used for printing (bit map data, etc.) Further, the contents management server may store and manage various information such as available period being associated with the contents. The contents management server 1 contains a contents holder 11 for retaining the contents, and a communication part 12 for performing communications with other clients, such as printed-matter issuing client and printed-matter verifying client.

The printed-matter issuing client 2 has a function to issue printed matters, and acquires the contents from the contents management server 1, prints them on the printing recording medium 4, and records ID information for specifying the contents into the printing recording medium 4. The printed-matter issuing client 2 may includes the communication part 21 and the recording part 22. The communication part 21 makes an access to, for example, the contents management server 1 which manages the contents, and acquires the contents therefrom. The recording part 22 prints the contents on the printing recording medium 4, and records the ID information into the printing recording medium 4. An ID information recording method may be selected from among many storing methods. In this embodiment, the IC chip 41 is integrated into the printing recording medium 4, and the ID information is stored into the IC chip 41. The ID information may be stored into the IC chip 41 electrically through electrical contacts, or electromagnetically or optically. In the latter case, to store the information, the recording part communicates with the IC chip by use of radio wave or light. The ID information must have at least a function to specify the contents, and to this end, for example, a storage place (e.g., URL) of the contents may be stored in the IC chip. In the description to be given, the ID information involves at least information of the storage place o the contents. Various other information such as certify key may additionally be contained in the ID information. If the ID information to be written into the IC chip 41 is enciphered, a security level of the ID information is further increased.

The printed-matter verifying client 3 judges the authenticity of a printing recording medium such as carried printing recording medium as an object to be verified. Basically, the printing recording medium 4 to be verified is issued in the printed-matter issuing client 2. A possibility that it was forged or its print surface was altered is present. The printed-matter verifying client is used mainly for the purpose: it spots the illegal printing recording medium, and if the medium is a security, rejects the use of it.

The printed-matter verifying client 3 includes an information acquiring part 31, communication part 32, verifying part 33, and others. The information acquiring part 31 reads the contents printed on the printing recording medium 4 to be verified in the form of an image, and reads out ID information from the same. In this case, it reads out the ID information from the IC chip 41 since the IC chip is contained in the printing recording medium 4. The ID information may be read out of the IC chip 41 electrically through electrical contacts, or electromagnetically or optically. In the latter case, to read out the ID information, the recording part communicates with the IC chip by use of radio wave or light. The ID information reading method may be different from the ID information writing method. As described above, the ID information contains a storage place of the contents printed on the printing recording medium 4. The information acquiring part 31 acquires at least the contents storage place as the ID information. When failing to acquire the ID information, it may judge that the printing recording medium 4 is false, at this stage. For example, in case where an image on the print surface of an original printing recording medium is illegally reproduced by on a printing recording medium not containing the IC chip copying, such a falsification can be detected at the stage of reading.

The communication part 32 is communicable with the contents management server 1, for example. The information acquiring part serves as a contents communication means which specifies a storage place of the contents from the ID information as read by the information acquiring part 31, and acquires the contents per se or an image of the contents. In the embodiment, the contents are managed by the contents management server 1, and hence, the communication part 32 sends a contents downloading request to the contents management server 1 through the network 5, and receives the contents from the contents management server. In the case of contents other than image, the contents may be converted into an image in the contents management server 1 or may be converted into an image in the printed-matter verifying client 3 after it receives the contents. When failing to acquire the contents or the image of the contents, it may be judged that the printing recording medium to be verified is false.

The verifying part 33 verifies an image printed on the printing recording medium as an object to be verified, which is read out by the information acquiring part 31, with the image of the contents received by the communication part 32, and judges the authentication of the printing recording medium to be verified. If additional information such as available period is attached to the contents, the verifying part can check those additional information. The check process of additional information may be carried out in the contents management server 1 such that if the additional information satisfies conditions, the contents management server stops the return of the contents.

Operation of the first embodiment will be described hereunder. Operation description will be given by use of a case that the printing recording medium is a security. A security issuer stores information of the par value and available period of the security in the printed-matter issuing client 2. In this case, the information may be image information including text or image data (bit map data or the like) of the security per se. In an allowable case, only a template of a security is registered in advance, and when the printed-matter issuing client 2 issues a printed matter, it receives information of the par value or the like from the printed-matter issuing client 2, and forms the final contents for printing. The printing contents may be stored in the contents holder 11 or the same contents as the printing contents may be generated at the time of verification.

Figure 2:
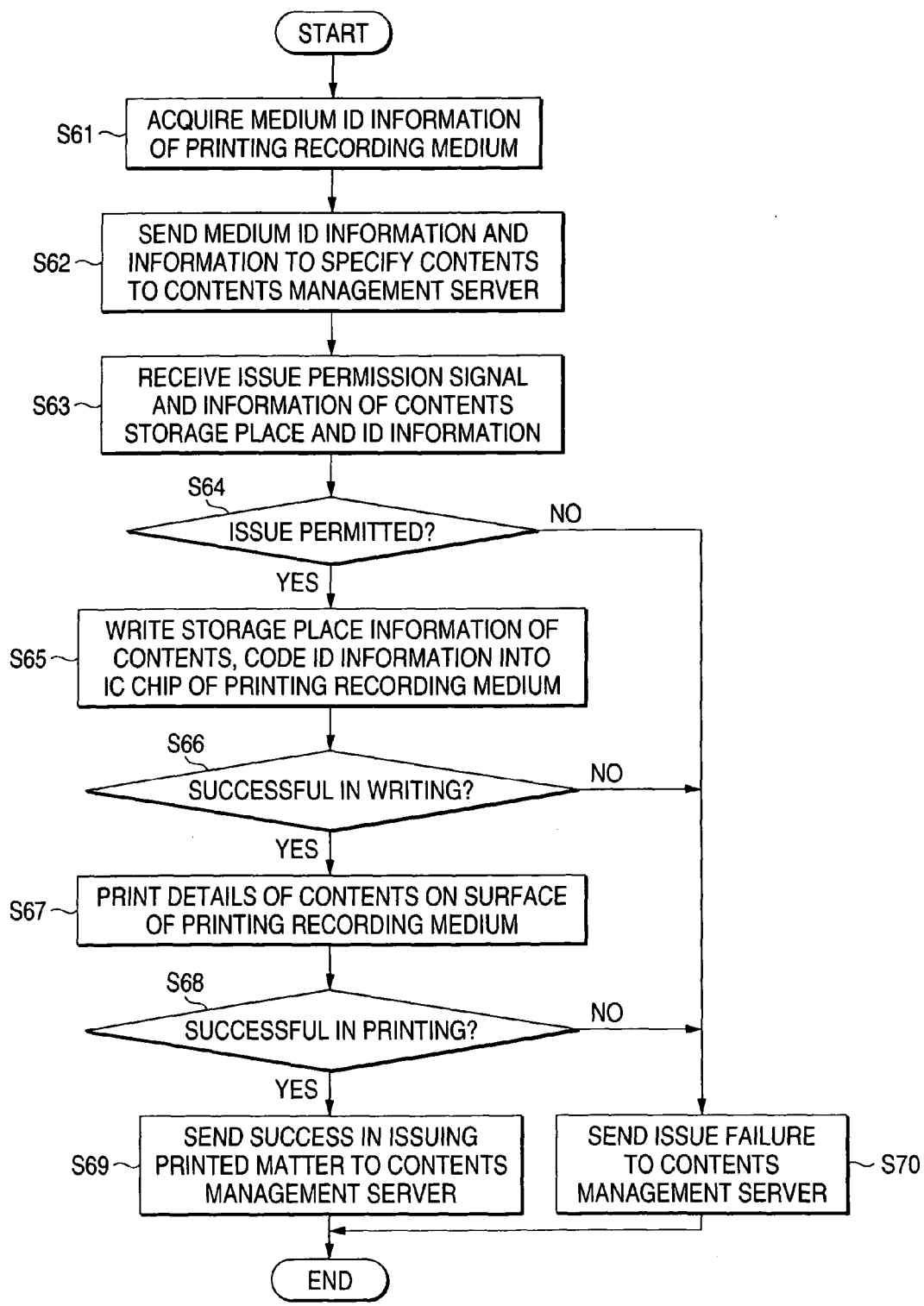
FIG. 2 is a flowchart showing operation in a printed-matter issuing client when it issues a printed matter.

FIG. 2 is a flow chart showing operation in a printed-matter issuing client 2 when it issues a printed matter. It is assumed that medium ID information is stored in the printing recording medium 4 in advance. To issue a printed matter, the printed-matter issuing client 2 acquires medium ID information of a printing recording medium 4 used for printing (step S61). The medium ID information may be previously stored in the IC chip 41 or in the print surface of the printing recording medium 4, and is read out therefrom. When the medium ID information cannot be acquired, the printing process of printing the contents is stopped or an error message that the printing recording medium is false may be presented.

When acquiring the medium ID information, the printed-matter issuing client sends to the contents management server 1 the medium ID information and information to specify the contents to be printed (e.g., ID of the contents) ((step S62). The printed-matter issuing client receives an issue permission signal and the details of the contents from the contents management server 1 (step S63). At that time, the printed-matter issuing client receives information of a storage place of the contents as the contents specifying information. Further, in this instance, it receives code ID information for taking out the contents when the verification is conducted. Any other suitable information other than the contents and the information for specifying the contents is optional, and other information may be received.

The printed-matter issuing client judges if it received the issue permission signal in the step S63 (Step 64). If the issue of the printed matter is not permitted, the printed-matter issuing client sends an issue failure to the contents management server 1, and ends the printed-matter issuing process ((step S70). If the contents ID of the contents already printed is falsified, the printed-matter issuing client spots such falsified printing recording medium and prohibits the issuing of the printing recording medium in the form of a printed matter.

In case where the issue permission signal is received, the printed-matter issuing client writes contents specifying information received in the step S63 into the IC chip 41 of the printing recording medium 4 (step S65). In this embodiment, storage place information of the contents, code ID information and others are written as ID information. In writing the ID information into the IC chip, it is preferable to encipher the ID information. The printed-matter issuing client judges whether or not the ID information is successfully written into the IC chip 41 (step S66). If unsuccessful in writing, the printed-matter issuing client sends the failure of the writing operation to the contents management server 1 (step S70), and ends the printed matter issuing process.

If successful in writing the ID information into the IC chip 41, the printed-matter issuing client prints the details of the contents received in the step 63 on the surface of the printing recording medium 4 (step S67). The printed-matter issuing client checks if it succeeds in printing (step S68). If successful in printing, the printed-matter issuing client sends a success in issuing the printed matter to the contents management server 1 (step S69), and ends the printed matter issuing process. If unsuccessful in printing details of the contents, the printed-matter issuing client a failure of the printing to the contents management server 1 (step S70), and ends the printed matter issuing process.

In this way, the printed-matter issuing client 2 issues a printed matter (security in this instance) having the contents, which are printed on the printing recording medium 4. In the process of acquiring the contents, communications between the contents management server 1 and the printed-matter issuing client 2 are carried out in good safety level.

The receiver having received the security, thereafter, can use the security. That is, he or she exchanges it with hard cash or goods. If it is a ticket, he or she can receive its service. In this case, during a period from the issuing of the security till it is used, there is a chance that the security is falsified, and such a security is used. Therefore, it is necessary to judge the authenticity of the security when it is used.

Figure 3:
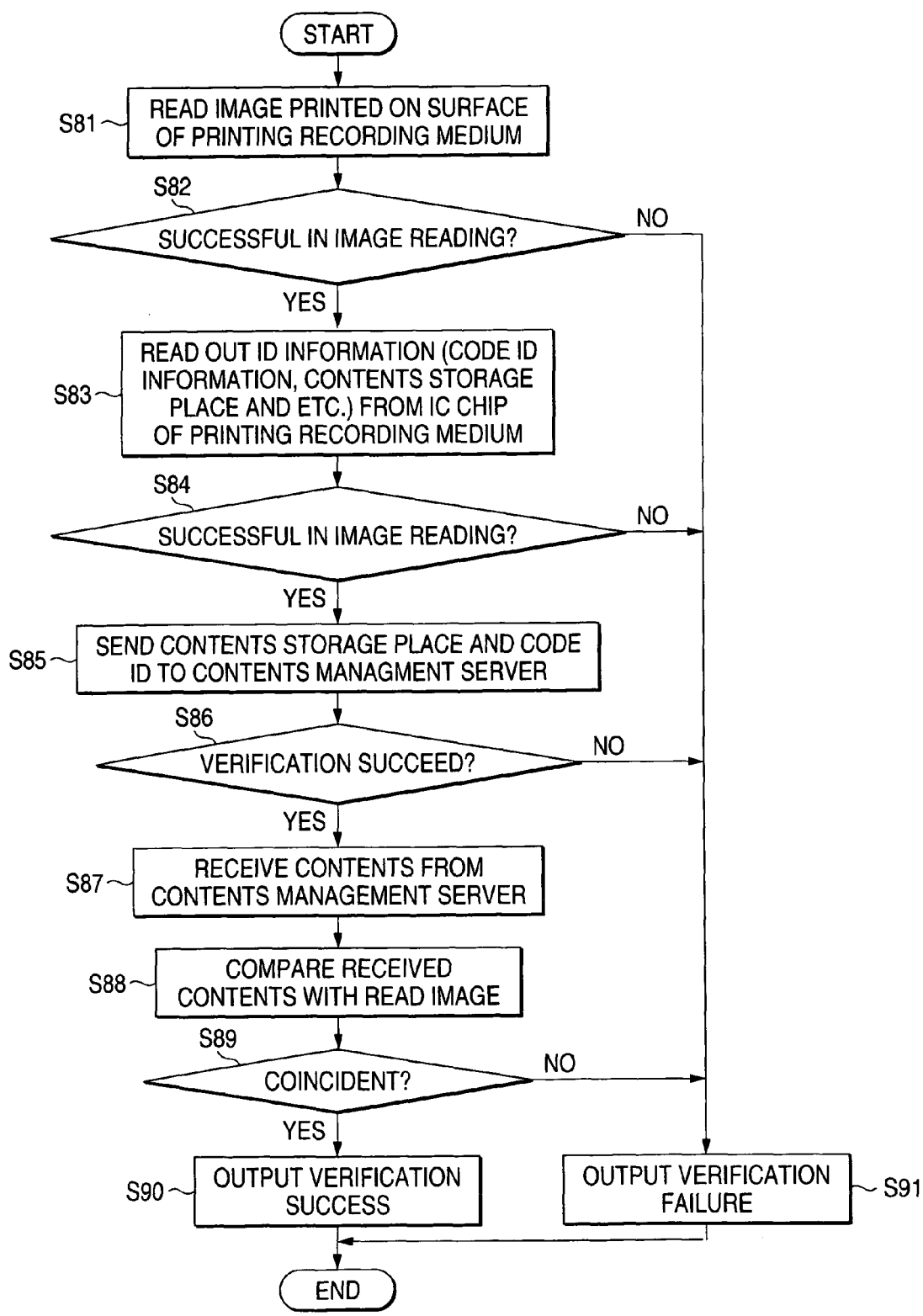
FIG. 3 is a flow chart showing an operation in a printed-matter verifying client.

A process of judging the authenticity of the securities is carried out in the printed-matter verifying client 3. FIG. 3 is a flow chart showing an operation in a printed-matter verifying client 3. In the judging process, the printed-matter verifying client reads an image printed on the surface of a printing recording medium 4 (a security in this instance) (step S81). The printed-matter verifying client then checks if the image reading succeeded (step S82). If unsuccessful, the printed-matter verifying client determines that it fails to verify the authenticity of the printing recording medium (step S91).

If succeeding in reading the image, the printed-matter verifying client acquires ID information from the IC chip 41 of the printing recording medium 4 (step S83). In the instance described referring to FIG. 2, the storage place of the contents and the code ID are stored, as ID information, into the IC chip 41. Accordingly, the information acquired by the printed-matter verifying client is those pieces of information. At this time, when those information items are ciphered, it deciphers them. In a step S84, the printed-matter verifying client judges if it succeeds in acquiring the ID information from the IC chip. If fails to acquire the ID information, it determines that the ID acquisition fails (step S91). A falsified printed matter produced by copying only the print surface does not contain the IC chip. Then, the printed-matter verifying client fails in acquiring the ID information from such a falsified printed matter and can spot the falsified printed matter through the acquisition failure.

If successful in acquiring the ID information, the printed-matter verifying client sends the ID information acquired in the step S83 including the contents storage place and the code ID to the contents management server 1, to thereby request the server to return the contents (step S85). Upon receipt of the code ID, the contents management server 1 verifies the authenticity of the security, and returns the verification result to the printed-matter verifying client. In a step S86, the printed-matter verifying client judges if it succeeds in its verification, and if unsuccessful, it determines that the verification resulted in failure (step S91).

If the verification succeeds, the printed-matter verifying client receives the details of the contents from the contents management server 1 (step S87). If the details of the contents consists of other data than the image data, for example, text data, the printed-matter verifying client also converts the data into image data. The printed-matter verifying client compares the details of the contents received from the contents management server 1 in the step S87 with the image on the surface of the printing recording medium 4 that is read in the step S81 (step S88). In the image comparison, it is prefereble to consider various conditions, such as errors generated in the image reading operation in the step S81, and read level. When the details of the contents are digital information such as text, it is allowed that the image read in the step S81 is analyzed by use of an OCR, etc., and the resultant is compared with the details of the contents.

In a step S89, the printed-matter verifying client judges whether or not the contents compared in the step S88 are coincident with each other. If both the contents are coincident with each other, the printed-matter verifying client determines that the verification succeeds (step S90). If not coincident, it determines that the verification fails (step S91).

In this way, the verification of the printing recording medium 4 is carried out. The security may be permitted to be used only when the printed-matter verifying client 3 verifies the authenticity of a security and the verification succeeds.

In the embodiment mentioned above, the IC chip 41 is integrated into the printing recording medium 4. In the present invention, the ID information may be expressed in the form of any of an electronic watermark, latent image, invisible print by infrared or ultraviolet rays and others, and they may be formed when the contents are printed. The printed-matter verifying client 3 may constructed to read an image from the printing recording medium 4, and then separate the ID information from the read image, and then recognize the ID information.

Figure 4:
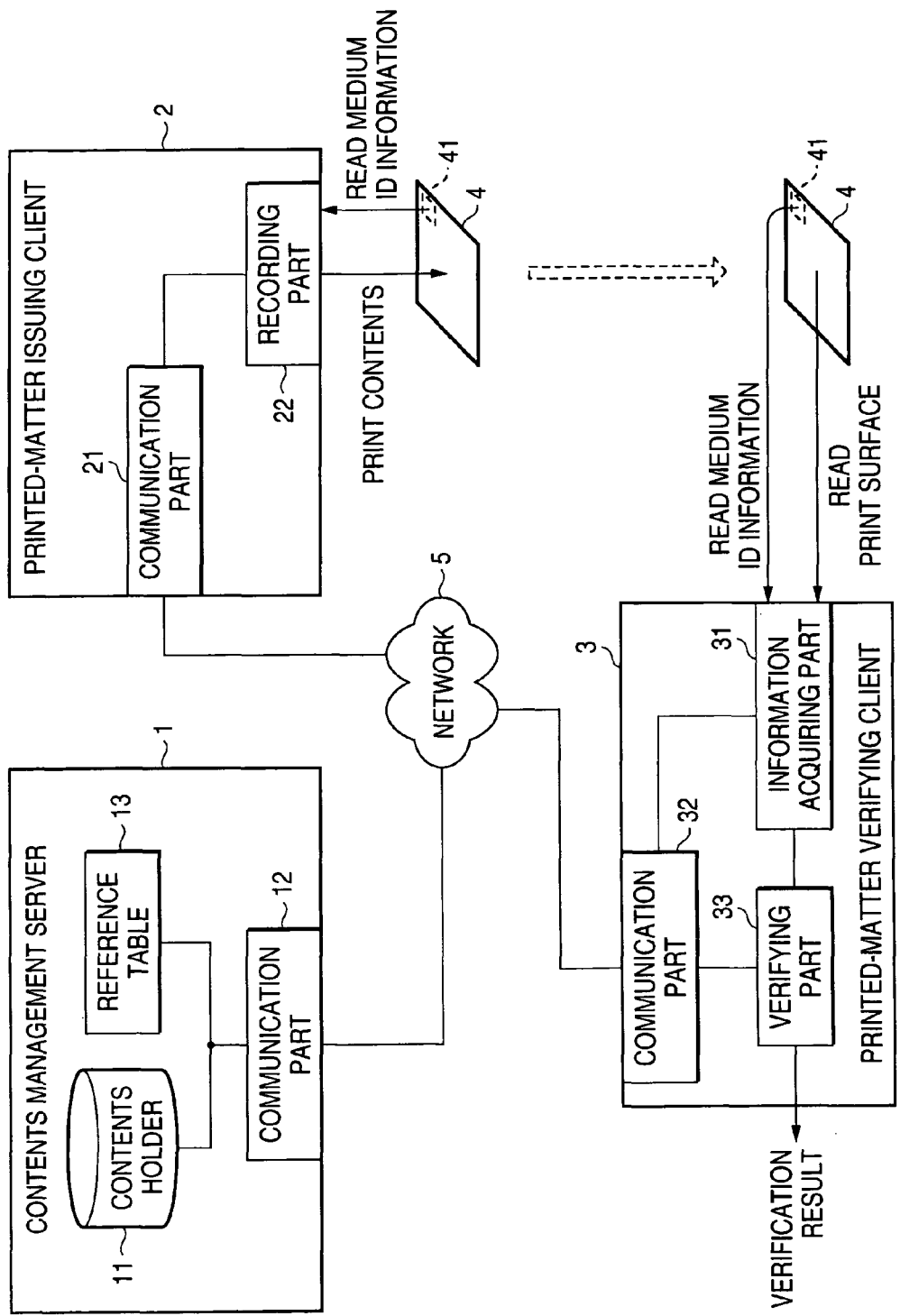
FIG. 4 is a block diagram showing a second embodiment of the present invention.

FIG. 4 is a block diagram showing a second embodiment of the present invention. In the figure, like reference numerals are used for designating like or equivalent portions in FIG. 1, and reference numeral 13 is a reference table. In the second embodiment, the IC chip 41 of the printing recording medium 4 is constructed with a memory to which data cannot be written, such as ROM. Medium ID information proper to the printing recording medium 4 is stored in the IC chip 41, such as a ROM.

In this instance, the contents management server 1 contains a reference table 13. The reference table 13 store the medium ID information of the printing recording medium 4 having contents printed thereon and ID information for specifying the printed contents. Any other suitable information may be stored therein, if necessary.

When the printed-matter issuing client 2 prints contents on the printing recording medium 4, operation of the printed-matter issuing client is as described referring to FIG. 2, with some exception. In the step S63, the printed-matter issuing client receives only the issue permission signal and the details of the contents. The writing process to the IC chip (step S65) and the process of checking if the writing operation succeeds (step S66) are not carried out. If the issuing of the printed matter is permitted, the details of the contents are printed on the printing recording medium 4.

In the contents management server 1, which receives a contents request from the printed-matter issuing client 2, the medium ID information received from the printed-matter issuing client 2 and ID information for specifying the contents to be transferred to the printed-matter issuing client 2 are stored in the reference table 13 in a corresponding fashion.

When a printing recording medium 4 to be verified is presented, the printed-matter verifying client 3 operates as shown in FIG. 3. And it reads the print contents of the printing recording medium 4 and the data from the IC chip 41. In this case, it reads out medium ID information of the printing recording medium 4. Then, it sends the read out medium ID information to the contents management server 1.

When receiving the medium ID information from the printed-matter verifying client 3, the contents management server 1 acquires ID information for specifying the contents corresponding to the received medium ID information referring the reference table 13, takes out the contents in accordance with the ID information, and sends it to the printed-matter verifying client 3.

Upon receipt of the details of the contents from the contents management server 1, the printed-matter verifying client 3 compares an image of the print surface read out from the printing recording medium 4 with the details of the contents, and verifies the authenticity of the printing recording medium 4 to be verified. In this way, even if the contents on the print surface of the printing recording medium 4 is altered, the printed-matter verifying client 3 recognizes the falsified printing recording medium.

In the embodiment described above, the IC chip 41 containing a ROM, for example, is incorporated into the printing recording medium 4. In alternative, medium ID information to specify the printing recording medium 4 is stored in advance in the printing recording medium. Any of various other techniques capable of identifying the printing recording medium 4 may be used. For example, medium ID information is printed in advance by use of infrared or ultraviolet rays. In another example, a paper which is manufactured containing permanent magnet particles or metal particles therein, is used for the printing recording medium.

In the instance shown in FIG. 4, the reference table 13 is stored in the contents management server 1. If required, it may be stored in another server.

Figure 5:
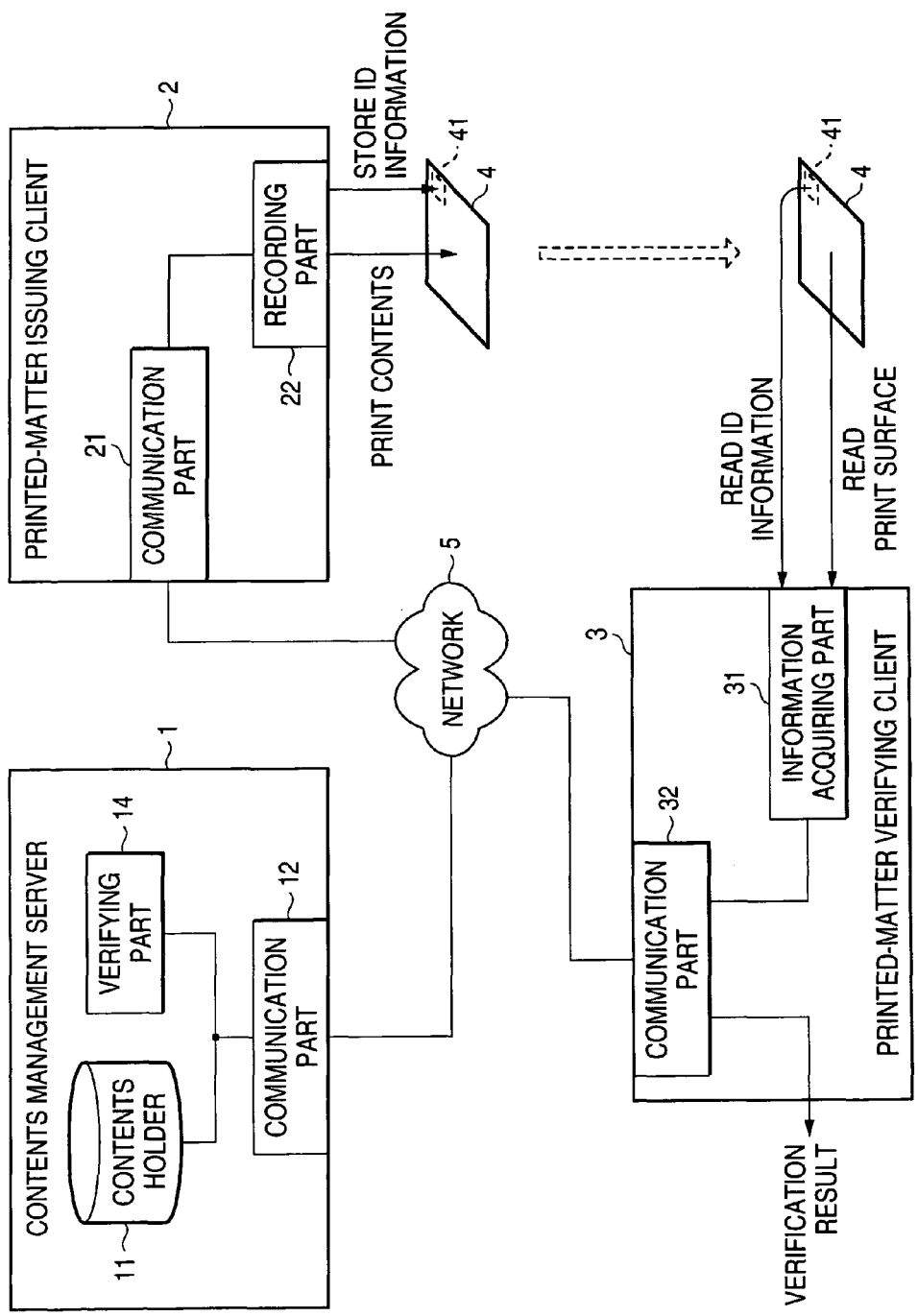
FIG. 5 is a block diagram showing a third embodiment of the present invention.

FIG. 5 is a block diagram showing a third embodiment of the present invention. In the figure, like reference numerals are used for designating like or equivalent portions in FIG. 1, and reference numeral 14 is a verifying part. While in the second embodiment, the verifying process is carried out in the printed-matter verifying client 3, it is carried out in the contents management server 1 in the third embodiment. A system construction for a process part till the printed matter is issued and its operation are similar to those in the first embodiment.

When a printing recording medium 4 to be verified is presented, the printed-matter verifying client 3 reads the print surface of the medium, and reads out ID information from the IC chip 41 incorporated therein. And in the third embodiment, it sends the image of the print surface and the ID information as well to the contents management server 1, and requests the contents management server to verify the authenticity of them.

The verifying part 14 of the contents management server 1 executes a process similar to that by the printed-matter verifying client 3 in the printed-matter verifying client 3 in the first embodiment. Specifically, it compares, for the verification, the print surface image, which is read out from the printing recording medium 4 by the printed-matter verifying client 3, with the details of the contents specified by the ID information, whereby it verifies the authenticity of the printing recording medium. In case where additional information, e.g., available period, is added to the contents, those additional information may be checked.

The contents management server 1 sends the verification result by the verifying part 14 to the printed-matter verifying client 3. The printed-matter verifying client 3 receives the verification result from the contents management server 1, and reports the true or false of the verified printing recording medium 4 to an operator. In this way, the system spots the falsified print surface of the printing recording medium 4.

In the third embodiment, when the printing recording medium 4 is verified, there is no necessity of transferring the contents. Therefore, there is less chance that a dangerous situation that a malicious person acquires and uses the contents under transfer occurs. It is readily understood that the third embodiment may variously be modified as the first embodiment.

In the first to third embodiments, the contents management server 1, printed-matter issuing client 2 and printed-matter verifying client 3 are separately constructed. If necessary, the contents management server 1 and the printed-matter issuing client 2 may be constructed as one unit or those clients and sever may be constructed as a single unit, stand-alone type.

As seen from the foregoing description, the present invention judges whether the printed matter is true or false or valid or invalid on the basis of information described in the print surface of the printed matter. Therefore, even when the information described in the print surface is altered, the invention reliably spots the falsification of the printing recording medium, and guarantees a safety of the printed contents of the printing recording medium. An electronic sheet, which allows information to be written into and read out of the sheet per se in a non-contact manner, may be used for the printing recording medium. In this case, the invention guarantees a high level of safety against the forging, reproducing and falsifying of printed matters to be issued.

What is claimed is:

1. A printed-matter issuing managing system comprising:
  a contents management section for managing contents;
  a printed-matter issuing section for printing the contents acquired from the contents management section on a printing recording medium; and
  a printed-matter verifying section for verifying authenticity of a printing recording medium to be verified and for outputting a result of the verification, wherein each printing recording medium contains a first ID information for specifying a storage location of contents thereof and a second ID information for specifying the printing medium, the printed-matter verifying section reads out the first ID information from the printing recording medium to be verified, acquires image information of the contents of which the storage location is specified by the first ID information from the contents management section, and compares the acquired image information with an image printed on the printing recording medium to be verified, thereby verifying the authenticity of the printing recording medium, and the second ID information and the contents of the printing recording medium which is specified by the second ID information are related in the contents management section;

wherein the first ID information contains a code ID for verifying the printing recording medium at the time of verification, and information on a storage place of reference information for specifying the contents printed on the printing recording medium, and the printed-matter issuing section stores the code ID and the information on the storage place of the reference information.

2. The printed-matter issuing managing system according to claim 1, wherein the printing recording medium contains an IC chip, the printed-matter issuing section records the first ID information in the IC chip, the printed-matter verifying section reads out the first ID information from the IC chip of the printing recording medium to be verified.

3. The printed-matter issuing managing system according to claim 1, wherein the printed-matter issuing section prints the first ID information, together with the contents, on the printing recording medium, the printed-matter verifying section reads out an image containing the first ID information from a printing recording medium to be verified and recognizes the first ID information.

4. A printed-matter verifying device for verifying authenticity of a printing recording medium on which contents are printed and which contains a first ID information for specifying a storage location of the contents and a second ID information for specifying the printing medium, the second ID information is associated to the contents, the printed-matter verifying device comprising:

an information reading section for reading an image from the printing recording medium together with the first ID information;

a contents acquiring section which inquires of an external device on the basis of the first ID information and acquires an image of contents printed on the printing recording medium; and a verifying section for comparing the image contents acquired by the contents acquiring section with the image read from the printing recording medium by the information reading section to verify the authenticity of the printing recording medium, wherein the first ID information contains a code ID for authenticating the printing recording medium at the time of verification, and information on a storage place of reference information for specifying the contents printed on the printing recording medium.

5. The printed-matter verifying device according to claim 4, wherein the printing recording medium contains an IC chip, the information reading section reads out the first ID information from the IC chip of the printing recording medium.

6. The printed-matter verifying device according to claim 4, wherein the information reading section reads an image containing the first ID information from the printing recording medium, and separates the first ID information from the image and recognizes the first ID information.

7. A printed-matter managing method comprising:

managing contents;

printing the contents acquired from a contents management section on a printing recording medium;

verifying authenticity of the printing recording medium to be verified and outputting a result of the verification, wherein each printing recording medium contains first ID information for specifying a storage location of contents thereof and second ID information for specifying the printing medium; and reading out the first ID information from the printing recording medium to be verified, acquiring image information of the contents of which storage location is specified by the first ID information from the contents management section, and comparing the acquired image information with an image printed on the printing recording medium to be verified, thereby verifying the authenticity of the printing recording medium, wherein the second ID information and the contents of the printing recording medium which is specified by the second ID information are related in the contents management section; and wherein the first ID information contains a code ID for verifying the printing recording medium at the time of verification, and information on a storage place of reference information for specifying the contents printed on the printing recording medium.

* * * * *